(12) United States Patent
Wexler et al.

(10) Patent No.: US 8,615,512 B2
(45) Date of Patent: Dec. 24, 2013

(54) GUIDING USER MODERATION BY CONFIDENCE LEVELS

(75) Inventors: Mike Wexler, Santa Clara, CA (US); Deepa Joshi, Sunnyvale, CA (US)

(73) Assignee: Yahoo! Inc., Sunnyvale, CA (US)

( * ) Notice: Subject to any disclaimer, the term of this patent is extended or adjusted under 35 U.S.C. 154(b) by 886 days.

(21) Appl. No.: 12/242,777

(22) Filed: Sep. 30, 2008

(65) Prior Publication Data

US 2010/0082640 A1    Apr. 1, 2010

(51) Int. Cl.
*G06F 17/30* (2006.01)
*G06F 7/00* (2006.01)

(52) U.S. Cl.
USPC .......................................... 707/723; 707/738

(58) Field of Classification Search
USPC ................................................ 707/723, 738
See application file for complete search history.

(56) References Cited

U.S. PATENT DOCUMENTS

| | | | | |
|---|---|---|---|---|
| 5,832,140 | A * | 11/1998 | Stapleton et al. | 382/298 |
| 6,115,709 | A * | 9/2000 | Gilmour et al. | 706/50 |
| 7,158,983 | B2 * | 1/2007 | Willse et al. | 707/999.101 |
| 7,246,128 | B2 * | 7/2007 | Jordahl | 707/999.101 |
| 7,487,095 | B2 * | 2/2009 | Hill et al. | 704/275 |
| 7,512,580 | B2 * | 3/2009 | Ronnewinkel | 706/52 |
| 7,529,722 | B2 * | 5/2009 | Kofman et al. | 706/59 |
| 7,640,272 | B2 * | 12/2009 | Mahajan et al. | 707/999.107 |
| 7,739,261 | B2 * | 6/2010 | Zeng et al. | 707/708 |
| 7,752,251 | B1 * | 7/2010 | Shuster et al. | 709/200 |
| 7,783,514 | B2 * | 8/2010 | Hogan | 705/14.49 |
| 8,165,518 | B2 * | 4/2012 | Smith et al. | 434/350 |
| 2002/0049738 | A1 * | 4/2002 | Epstein | 707/1 |
| 2002/0184235 | A1 * | 12/2002 | Young et al. | 707/104.1 |
| 2007/0027931 | A1 * | 2/2007 | Heckenbach | 707/200 |
| 2008/0229218 | A1 * | 9/2008 | Maeng | 715/760 |

* cited by examiner

*Primary Examiner* — Pavan Mamillapalli
(74) *Attorney, Agent, or Firm* — Martine Penilla Group, LLP

(57) ABSTRACT

Methods for guiding user moderation at a topic page by confidence levels includes presenting a topic page in response to a query. The topic page includes a plurality of modules with content that match the query. The topic page is associated with a confidence level and with one or more page attributes that define the characteristics of the topic page and the modules included therein. One or more modifications to the topic page are received as part of customization of the topic page. The modifications include a plurality of page attributes that define the modification and a plurality of user attributes of a user performing the modification. The modifications are evaluated based on the page attributes and user attributes including confidence levels associated with the topic page and the user. The modifications are implemented based on the evaluation. The implemented modifications enhance the quality and confidence level of the topic page.

18 Claims, 13 Drawing Sheets

*Pages to review/enhance.*

Navigation Toolbar 1

Navigation Toolbar 2

Navigation Toolbar 3

Insiders' Tools

Video Tutorials | FAQs | Top Searches | Discussion

Top Searches
Build a Glue Page for the most popular searches!

Overall

Business And Finance
Entertainment
Food and Drinks
Information And Reference
Lifestyle
News
Politics
Shopping
Sports
Technology and Science
Travel 1. upa trust vote
2. deepika padukone
3. katrina kaif
4. orkut
5. google
6. kareena kapoor
7. priyanka chopra
8. gmail
9. santa mirza
10. mallika sherawat
11. rank mukherjee
12. britney spears
13. shirdi
14. snoring
15. soha ali khan

Figure 5

GUIDING USER MODERATION BY CONFIDENCE LEVELS

CROSS REFERENCE TO RELATED APPLICATION

This application is related to U.S. patent application Ser. No. 12/116,198, entitled "Micro-Bucket Testing for Page Optimization," and to U.S. patent application Ser. No. 12/116,195, entitled "Algorithmically Generated Topic Pages," assigned to the assignee, which are incorporated herein by reference in its entirety for all purposes.

BACKGROUND

1. Field of the Invention

The present invention relates to web page content optimization, and more particularly, to optimizing page content by moderating changes contributed by users based on confidence levels.

2. Description of the Related Art

Internet searching has become ubiquitous with web navigation. During web navigation, a query for a topic page is received at a server. An algorithm, such as a glue algorithm, on the search engine is used to identify a topic category associated with the query, search a repository of information available to the search engine to identify a plurality of contents that match the query. The contents are provided in the form of modules. A topic page is generated using the identified content modules. The modules within the topic page may include a variety of contents in varied formats that are most relevant to the query. The topic page is associated with the most popular topic category for the query. The generated topic page is returned in response to the query.

The returned topic page may be customized by a user to suit his needs. As part of customization, one or more modules may be added, deleted or relocated. Additionally, one or more modules from the algorithm generated topic page may be replaced by one or more user defined modules. The customized topic page may be stored in the repository under the user so that the customized topic page may be rendered for subsequent query by the user.

When a subsequent query is received at the server, the algorithm within the server identifies the topic category, searches the repository of information to determine a topic page matching the query and returns the topic page in response to the query. There is, however, a constant quest to determine which topic page is a best match for the query, whether the user generated topic page is better than the algorithmically generated topic page and if the returned topic page is optimal or not.

One way of determining the optimal topic page is through a mechanism called bucket-testing. The bucket testing mechanism uses user interaction at each of the topic pages to determine the popularity of the corresponding topic pages. User interactions, such as click-throughs, resident time at the topic page including resident time at each of the modules, etc., are gathered and the popularity of the topic page is determined. Based on the determination, the most popular topic page is considered as the most optimal for the query.

One of the issues with the bucket testing mechanism is that it requires a fairly large sample of user data/interactions in order to determine the popularity of the topic page. As a result, when a topic page is very infrequently accessed or has insufficient amount of user interactions, it is difficult to determine if the topic page is optimal or not. If a change needs to be made to such topic pages, it will take a long time to obtain a large enough data sample in order to determine if the change was optimal or not. As a result, it is difficult to determine which topic page is a better match for the query in a short period of time. As a result, for a topic page with insufficient user interaction data, bucket testing becomes tedious, time-consuming and often impractical to use.

It is in this context that the embodiments of the invention arise.

SUMMARY

Embodiments of the present invention provide methods that enable guiding user moderation of_a topic page by confidence levels. The method employs a moderation algorithm that evaluates the topic page to determine if the topic page includes optimal modules and content for the query. In addition, any modifications to the topic page are evaluated to determine if the modifications improve or lower the quality of the topic page. Based on the evaluation, the modifications are implemented or discarded. Towards this end, the method includes receiving the modifications to a topic page, evaluating the modifications and determining which modifications to include and which modifications to discard.

The moderation algorithm may also search and select a plurality of topic pages with low confidence levels for a query category, present the plurality of topic pages to a user, allow the user to select a particular topic page from the plurality of topic pages for a query category and provide modifications to the selected topic page. A moderation algorithm will evaluate the modifications to the selected topic page and implement the modifications if the modifications to the selected topic page have a higher confidence level than the confidence level of the topic page or module being modified or replaced.

By controlling the modifications to the topic page based on the confidence level, the most optimal and popular topic page is presented to a user for a query. The algorithm, thus, provides a tool to maintain the quality of the topic page while providing flexibility to customize the topic page. The algorithm also provides a way to "weed" out unnecessary customizations or ineffective topic page generated by the algorithm with lower confidence level. The tool provides the ability to evaluate a topic page without requiring a large sample of user interaction data.

It should be appreciated that the present invention can be implemented in numerous ways, such as, methods or a system. Several inventive embodiments of the present invention are described below.

In one embodiment, a method for guiding user moderation at a topic page by confidence levels, is disclosed. The method includes presenting a topic page in response to a query. The topic page includes a plurality of modules with content that match the query. The topic page is associated with a confidence level and with one or more page attributes that define the characteristics of the topic page and the modules included therein. One or more modifications to the topic page are received as part of customization of the topic page. The modifications include a plurality of page attributes that define the modification and a plurality of user attributes of a user performing the modification. The modifications are evaluated based on the page attributes and user attributes including confidence levels associated with the topic page, modules and the user. The modifications are implemented based on the evaluation. The implemented modifications enhance the confidence level of the topic page.

In another embodiment, a method for guiding user moderation at a topic page by confidence level, is disclosed. In this embodiment, a plurality of topic pages that have low confidence levels are presented in response to the query. Each of the topic pages includes a plurality of modules. Each of the plurality of topic pages is associated with one or more page attributes, including a confidence level, that define the characteristics of the topic page and the modules contained therein. The confidence level of each of the topic pages presented in response to the query is below a threshold value. One or more modifications are received at a topic page selected from the plurality of topic pages presented in response to the query. The modifications to the topic page are evaluated based on the page attributes and user attributes. The evaluation of the modifications includes comparing the confidence level of the topic page with the confidence level in the user and their proposed changes. The modifications to the selected topic page are implemented if the confidence level of the modifications exceed the confidence levels of the existing topic page and the associated modules.

Thus, the embodiments of the invention provide a tool to customize a topic page while ensuring the quality of the topic page. The modifications that enhance the confidence level of the topic page are implemented while modifications that do not enhance the confidence level of the topic page are discarded. The confidence level represents the acceptability rating and popularity of the topic page and that of the user that is making the modifications and the tool provides a means to improve the quality of the topic page presented for a query. The resulting topic page substantially increases user engagement thereby making it a potential marketing and monetizing tool.

Other aspects of the invention will become apparent from the following detailed description, taken in conjunction with the accompanying drawings, illustrating by way of example the principles of the invention.

BRIEF DESCRIPTION OF THE DRAWINGS

The invention may best be understood by reference to the following description taken in conjunction with the accompanying drawings.

FIGS. 3A, 3B-1, 3B-2, 3C and 3D illustrate a simple block view of a topic page with a plurality of content modules that are used to guide user modification, in accordance with one embodiment.

FIG. 5 illustrates a simplified block diagram of an insider tool available to a user to guide user modification, in one embodiment of the invention.

DETAILED DESCRIPTION

Figure 1:
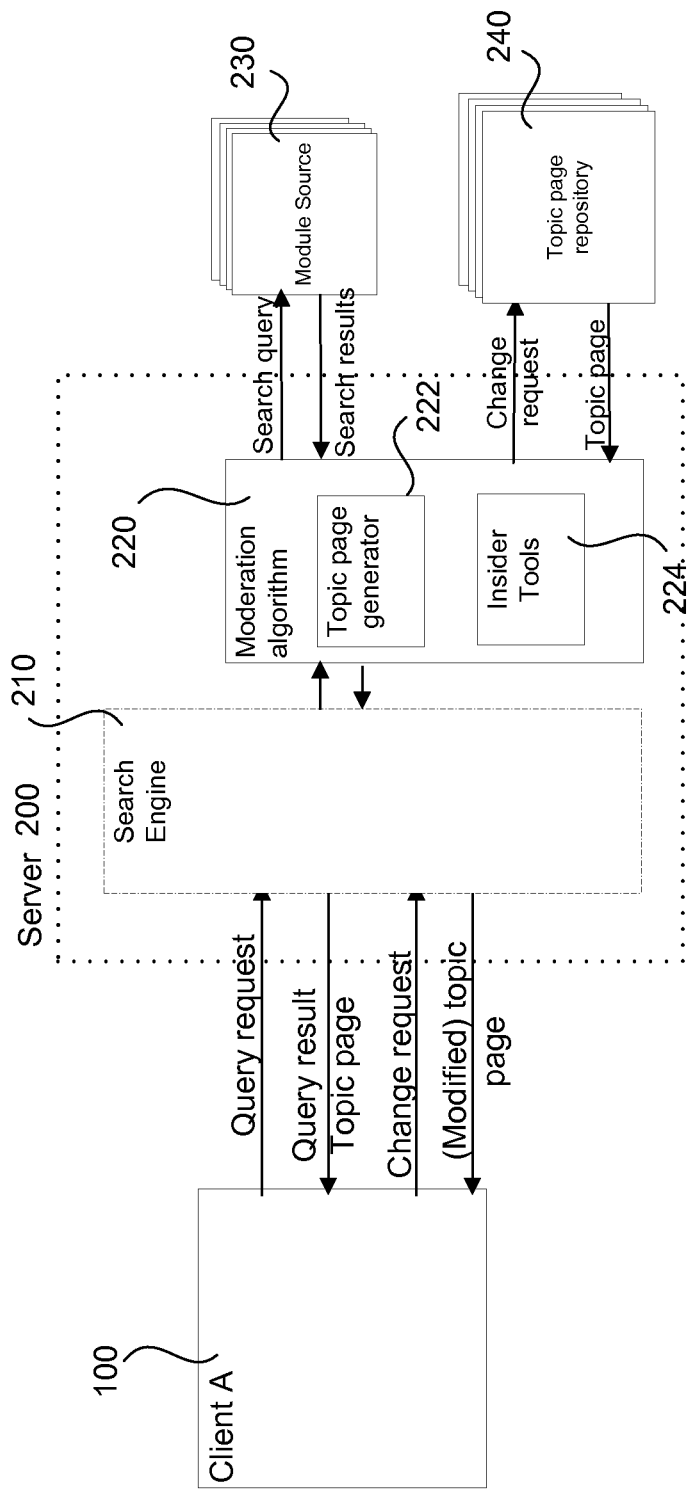
FIG. 1 illustrates a high-level block diagram of a generic computer system identifying various modules used in guiding user moderation by confidence levels, in accordance with one embodiment.

Broadly speaking, the embodiments of the present invention provide methods and systems to guide user modifications to a topic page in order to maintain or enhance the confidence level of the topic page. The confidence level of the topic page predicts the popularity of the topic page amongst users and can be used as a good marketing and monetization tool. The methods are applicable to any webpage having content, and content defined in any format.

By way of example, the method can be applied to a webpage that is automatically generated based on a query. In accordance with the method, the query is received at a search engine on a server. The search engine forwards the query to a system which identifies and returns a webpage (e.g., a topic page) in response to the query. Topic pages can be created ahead of time or at query time by a moderation algorithm that receives, analyzes and categorizes the query and selects, places and ranks a plurality of modules that match the query within a webpage, such as a topic page. The topic page is associated with one or more page parameters including a confidence level. Each of the plurality of modules within the topic page are associated with one or more module parameters including a confidence level. In one embodiment, the confidence level of the topic page is determined based on the confidence level of the modules that make up the topic page. The topic page is returned for rendering in response to the query. The rendered topic page provides the most relevant and popular modules for the query.

One or more users viewing the webpage may desire to customize the webpage. A change representing customization is provided at the webpage through user interaction. A moderation algorithm detects the change to the webpage including changes to one or more modules of the webpage. The change may take any form including addition of a new module, deletion of an existing module, relocation of one or more modules within the topic page, formatting of the webpage, etc.

Before implementing the change (modification), the user modifications are evaluated by the moderation algorithm to determine if the modifications to the webpage enhance or diminish a confidence level associated with the webpage. During evaluation, the confidence level of the webpage without the modifications is first determined. If the confidence level of the webpage without modifications is above a threshold value, then the modifications may or may not be considered for implementation. In one embodiment, when the confidence level of the webpage without modifications is very high, then the modifications are automatically discarded. This may be due to the fact that any modifications to this highly rated topic page may potentially reduce the high confidence level of the webpage. In another embodiment, when the confidence level of the webpage without the modifications is above the threshold value, the modifications to the webpage are evaluated to determine the confidence level of the webpage with the modifications and compared against the confidence level of the webpage without the modifications. If the confidence level of the webpage with the modifications is higher than the confidence level of the webpage without the modifications, then the modifications are implemented else they are ignored or discarded.

If, on the other hand, the confidence level of the webpage is below a threshold value, then the user modifications are considered for implementation. In such a case, the user parameters and page parameters associated with the modifications are used to dynamically determine the confidence level of the webpage with the modifications. The confidence level of the webpage with the modifications is compared against the confidence level of the webpage without the modifications to determine if the modifications enhance or diminish the confidence level of the webpage. If the modifications enhance the confidence level of the webpage, then the modifications are implemented otherwise they are discarded or ignored.

The confidence level determines the popularity of the webpage which directly relates to the user traffic to the webpage and user engagement within the webpage. As a result, when the confidence level of a webpage increases, the popularity of the webpage and hence the amount of user traffic to the webpage also increases. In addition, user engagement at the webpage also increases thereby making the webpage an effective marketing and monetization tool.

Thus, an alternate tool to determine and maintain/enhance the quality of the topic page is provided in the form of a moderation algorithm. By providing a tool to monitor the user modifications and the corresponding confidence level, quality of the webpage is maintained. The tool also provides for user customization thereby enriching a user's web experience. Due to dynamic and interactive nature of the content in a webpage, it is essential to determine which of the changes to the content are good and desirable in order to maintain a high confidence level. In some cases, the change suggested through user interaction may not be optimal or may be of poor taste. In such instances, the tool provides an effective filtering mechanism to ensure that the quality of the webpage is upheld. The tool, thus, essentially determines when to allow user customizations at a webpage, when to retain algorithmically generated content and when to replace user generated content with algorithmically generated content and vice versa. The tool also guides users towards areas where changes are likely to be beneficial. The tool, thus, provides a simple and effective way of determining optimal content for a webpage without having to rely on a huge data sample.

It should be understood that the moderation algorithm can be in the form of a code running on one or more servers, or hardware and software. If the query for a webpage is a search query, then the optimizing algorithm will also be available to the search engine code. The optimizing algorithm code does not have to be integrally coupled to the search engine logic but be available to the search engine logic on the server. It should be noted that the use of webpage should be broadly construed to include any type of page, not necessarily tied to a search page. Example pages include, for instance, front pages, user's customized pages (e.g., My Yahoo!™), and other vertical content pages typically used by Yahoo!™ and others.

FIG. 1 illustrates a simplified block diagram of various modules of a computer system used in guiding user moderation at a webpage, such as a topic page, based on confidence level, in one embodiment of the invention. The computer implemented system includes a client 100 with a user interface to receive and transmit a query, such as a search query, to a server 200 over a network (not shown), such as the internet. The network connection may be wired or wireless. A search engine 210 on the server 200 receives the query from the client 100 and forwards the query to a moderation algorithm module 220 available to the search engine 210 at the server 200. The moderation algorithm 220 analyzes the query to determine one or more dimensions to the query and interacts with a plurality of sources 230 to determine if a topic page matching the one or more dimension is available. If a topic page is not already defined for the query, then the moderation algorithm forwards the query to a topic page generator algorithm 222. The topic page generator algorithm 222 may be integrated with the moderation algorithm 220 or may be distinct and interact with the moderation algorithm 220. The topic page generator algorithm determines a category for the query in order to identify and select one or more modules to incorporate in a topic page. In one embodiment, the topic page generator algorithm 222 determines the category by examining click logs from previous queries and for each link that was clicked determining the category of the page that was clicked on and then picking the most common category clicked on. The confidence in the topic category is based on the number of clicks available for determining the category and the percentage that point to the most popular category. For instance, if a particular query appeared in the click logs 10 times and 6 out of those 10 times the page clicked on was for category 'X', then category X has a low confidence level. If, on the other hand, if a query appears 10 million times in the click logs for a particular query and 99.99% of the time, the query was associated with category 'Y', category Y would be chosen with a high level of confidence.

Upon determining the topic category, the topic page generator algorithm 222 interacts with a plurality of sources 230, such as module sources, over the network (not shown) to identify and select a plurality of modules that match the query's topic category. The modules are selected based on historical data of usage so that the most popular and relevant modules are included in the topic page. In addition to the selected modules, the topic page generator 222 may also search and select a plurality of search result links that match the query, when the query is a search query. The search result links are brought together into a separate search results module. A glue algorithm within the topic page generator 222 brings the selected modules together into a topic page for the query. The glue algorithm includes logic to analyze the various modules, place and rank each of the modules in the topic page. For more information on topic page generation and glue algorithm, reference can be made to U.S. patent application Ser. No. 12/116,195, entitled "Algorithmically generated Topic Pages," assigned to the assignee, which is incorporated here by reference in its entirety for all purposes. The relative placement of the modules within the topic page may be based on the confidence level of each of the modules that make up the topic page. The topic page generator then determines and associates a plurality of page attributes to the topic page to define the characteristics of the topic page and of the modules contained within the topic page. One of the page parameters is the confidence level of the topic page. The confidence level for the topic page is computed using one or more extrinsic information associated with the topic page. Some of the extrinsic information may include confidence level associated with the topic page category, confidence level associated with one or more modules within the topic page and confidence level of one or more users that are associated with either the creation or modification of one or more modules within the topic page. For instance, if a professional editor (user) reviews a topic page and ranks it well, the topic page would have a higher confidence level. Topic pages that are similar to the topic page that was reviewed could also see a boost in the confidence level based on the editorial review and rank of the topic page.

The topic page is stored in a topic page repository 240 so that the topic page may be considered for subsequent queries. It should be noted that the topic page and the corresponding confidence level for the topic page need not be generated at query time. In one embodiment, a batch process may be used to generate the plurality of topic pages for various topic categories and stored in the topic page repository. During query time the topic page repository may be looked up to determine the appropriate topic page. The topic page repository 240 may be stored on a plurality of servers and made available to the topic page generator and other algorithms available to the server 200. The topic page is returned to the user interface on the client 100 in response to the query. The topic page is rendered on the user interface.

It should be understood that the topic page generator 222 can be in the form of a code running on one or more servers, or can be in the form of hardware and software. The topic page generator 222 is available to the search engine 210. It does not have to be integrally coupled to the search engine logic on the server but can remain distinct and be available to the search engine logic on the server.

One or more user interactions at the topic page are captured by the user interface at the client 100. The user interactions may include modifications to one or more modules within the topic page such as addition of a module, deletion of a module, relocation of one or more modules, re-formatting of the topic page, etc. The modifications are forwarded to the server 200 as change requests for the query. The search engine 210 on the server 200 receives the modifications and forwards the modifications to a moderation algorithm 220. The moderation algorithm 220 may be in the form of a code running on the server 200 and may be integrally coupled to the search engine logic or may remain distinct and be available to the search engine logic on the server 200. Alternatively, the moderation algorithm 220 may be running on one or more servers and be available to the server 200. Additionally, the moderation algorithm may be integrally coupled to the topic page generator 222 or may remain distinct and may interact with the topic page generator 222. The moderation algorithm may also be in the form of hardware and software.

The user interaction at each module from a plurality of users may be gathered and used as feedback for re-rating each of the modules within the topic page. The re-rating of the modules is done during future rendering and is not dynamically calculated.

The moderation algorithm 220 includes logic to evaluate the modifications to determine if the modifications should be implemented in the topic page or not. The modifications to the topic page may include one or more page attributes that define the characteristics of the modifications. In one embodiment, some of the page attributes that may be associated with the modifications include topic page ID, page category, page intent, page geo location, module ID, module confidence level, module intent, module placement and other module related information. The moderation algorithm examines the page attributes and determines a page confidence level for the topic page with the modifications. The moderation algorithm 220 includes logic to examine the various page attributes associated with the modifications to determine if the modifications should be implemented in the topic page. To begin with, the moderation algorithm determines a page confidence level of the original topic page without the modifications. This is obtained by examining some extrinsic information, such as the page attributes, associated with the original topic page. The moderation algorithm then compares the confidence level of the original topic page against a threshold value. The threshold value may be pre-defined and may be unique to each topic category or may be a standard, generic value.

When the confidence level of the original topic page is equal to or above the threshold value, the moderation algorithm may or may not consider implementing the modifications. In one embodiment, when the confidence level of the original topic page is above the threshold value, the moderation algorithm will not implement the modifications to the original topic page. This may be due to the fact that any change to the highly rated topic page may lower the confidence level of the topic page. For instance, if the threshold value is set at 90% and the confidence level of the topic page is at 95%, then the moderation algorithm would consider discarding or ignoring the modifications to this topic page as the modifications may reduce the overall rating of the topic page. In one embodiment, an appropriate message may be rendered at the user interface on the client 100 to indicate that the modifications have not been implemented. For instance, a message indicating, "This is a highly rated topic page. Modifications to this topic page are not allowed/permitted", may be rendered at the user interface on the client 100 to inform a user that his/her change was not considered. In one embodiment, appropriate checks are put in place to deter any modifications to the highly rated topic page. In another embodiment, the moderation algorithm may consider the modifications to a highly rated topic page for a short period of time and discard after the expiration of the short time period. In still another embodiment, the moderation algorithm may consider implementing the modifications. There are various reasons why the modifications to a highly rated topic page may be considered for implementation. For instance, one of the reasons may be that the modifications are from a trusted source, such as an expert user. Another reason may be that the modifications further boost the confidence level of the topic page. As a result, some of the modifications are considered for implementation while others are discarded or ignored.

On the other hand, if the confidence level of the original topic page is below the threshold value, the moderation algorithm may consider implementing the modifications in order to boost the confidence level of the topic page. In one embodiment, when the confidence level of the original page is below the threshold value, any modifications to the topic page are automatically considered for implementation. This may be due to the fact that any modifications are likely to boost the overall confidence level of the topic page. In one embodiment, when the confidence level of the original topic page is below the threshold value, the modifications are considered for implementation based on one or more parameters associated with the topic page. The modifications to the topic page include one or more user parameters associated with a user making the change in addition to the one or more page parameters associated with the topic page. The user parameters include one or more of user ID, user status (such as active, inactive), user confidence level, user location, user level (such as novice, junior, senior, expert), user reputation, etc. The moderation algorithm may use the user parameters to determine the frequency of change performed by the user and to determine how well those changes have been historically accepted. Using these user parameters that define some of the extrinsic information of the user, confidence level of the user may be computed. For instance, extrinsic information, such as how often the user has changed topic pages in the past, whether those changes have been reverted, whether usage metrics improved after the user's changes were applied, whether complaints were received about their changes, may be determined and used in computing the confidence level of the user. If a modification by a user provides good engagement metrics, the confidence level of the user goes up due to the fact that the modifications by the user was instrumental in bringing and/or engaging more users at the topic page. The moderation algorithm analyzes the user parameters along with the page parameters associated with the modifications when considering implementation of the modifications. If the modifications are not from a trusted source, the moderation algorithm may have to reconsider implementing the modifications. On the other hand, if the modifications are from a trusted source or from a source with good reputation, the moderation algorithm may consider automatically implementing the modifications to the topic page.

When the modifications are considered for implementation in the topic page, the moderation algorithm 220 evaluates the modifications based on the page parameters and user parameters associated with the modifications. In one embodiment, appropriate message may be presented at the user interface to indicate that the modifications are being considered. For instance, a message such as "Modifications to the topic page just entered will be evaluated and considered for implementation accordingly," may be rendered upon receiving the modifications. The message can be in the form of an informational pop-up window at the topic page. The moderation algorithm 220 dynamically computes a new confidence level for the topic page with the modifications based on the page parameters and user parameters associated with the modifications. The new confidence level of the topic page with the modifications is compared against the confidence level of the original topic page without the modifications. When the confidence level of the topic page with the modifications is greater than the confidence level of the original topic page, the moderation algorithm implements the modifications in the topic page. When the new confidence level of the topic page with modifications is less than the confidence level of the original topic page, the modifications are ignored, discarded or implemented for a short period of time and then discarded.

In one embodiment, when implementing the modifications based on one or more user parameters, the confidence level of the user is compared against a threshold value. The threshold value may be common to both the topic page and the user or may be distinct. In the instance where the threshold value for the page and the user is distinct, the user threshold value may be based on one or more of user's prior history of modifications, status, level, or any combination thereof. For instance, the prior history may determine the frequency of modifications performed by the user, confidence level of the user making the change based on historic data including historic acceptance level of modifications by this user. If the confidence level of the user is greater than the threshold value, then the modifications are automatically considered for implementation. The confidence level of a user often relates to the credibility of the user. If the credibility of the user is high, then any modifications made by this user may directly relate to increase in the confidence level of the topic page which may lead to increase in traffic to the topic page. Thus, based on the high confidence level for this user, the modifications by this user will be considered favorably and implemented automatically.

If the confidence level of the user is below or equal to the threshold value, then the user may not have sufficient credibility and the modifications to the topic page may or may not be considered. The confidence level of the user may be low for a variety of reasons. For example, the user may be a novice or may have a bad reputation or may not have any history of modifications. In one embodiment, when the confidence level of the user is below or equal to the threshold value, the moderation algorithm evaluates the page parameters associated with the modifications to determine if the modifications enhance the overall confidence level of the topic page. The page parameters may include confidence level of each of the modules within the topic page and the new confidence level of the topic page with the modifications may be computed based on the module and other page parameters. The new confidence level of the topic page is then compared against the confidence level of the original topic page and based on the comparison, the modifications are considered for implementation.

In one embodiment, a user generated topic page may have multiple versions. In this instance, the user generated topic page may have had a higher confidence level than an algorithmically generated topic page or may have been put together due to lack of information about one or more dimensions of the query or the algorithm may have been unable to generate a topic page due to the vagueness of the query at the time of implementation of the topic page. This user generated topic page may be very old and/or used infrequently. When a subsequent query is received at the server 200, the moderation algorithm may analyze the topic page associated with the query to determine the various page parameters associated with the topic page. During the analysis, it might be determined that the topic page returned for the query is old and/or may have a confidence level that is below a threshold value. Based on the analysis, the moderation algorithm may interact with the topic page generator to obtain a new topic page for the same query with modules identified and selected by the topic page generator. The newly generated topic page is then associated with a plurality of page parameters that define the characteristics of the new topic page. The moderation algorithm then computes the confidence level of the newly generated topic page and evaluates the confidence levels associated with the new topic page and the old topic page to determine which topic page to retain and which one to discard. Since the newly generated topic page does not have an intrinsic confidence level, the confidence level of the newly generated topic page is determined through extrinsic information associated with the newly generated topic page such as confidence level of modules that make up the topic page and of one or more users to compute the confidence level of the newly generated topic page.

Based on the evaluation, appropriate topic page will be associated with the query for subsequent query rendering. In one embodiment, the new topic page may have a higher confidence level than the old topic page for the query, in which case, the new topic page will be associated with the query and the old topic page will be discarded. In another instance, the old topic page may have a higher confidence level than the algorithmically generated new topic page. In this case, the old topic page may be associated with the query and the new topic page may be discarded.

In yet another embodiment, in addition to comparing the confidence levels of the new topic page and old topic page, the moderation algorithm may weigh in on other parameters associated with the two topic pages to determine which topic page to keep and which one to discard for the query. For instance, if the new topic page has the same confidence level as the old topic page for a query, the moderation algorithm compares other parameters associated with the new and old topic pages to determine which topic page to keep and which one to discard for the query. In one embodiment, the content of the old user generated topic page may be more recent than the content of the new topic page, in which case, the old, user-generated topic page will be retained and the new topic page will be discarded. In another embodiment, the new topic page may have a lower confidence level than the old topic page but the content of the new topic page may be more recent than the old topic page. In this embodiment, the new topic page may be associated with the query and the old topic page may be discarded depending on the difference in the confidence level of the old and the new topic pages. Thus, the moderation algorithm weighs in on the confidence level based on other extrinsic page parameters to determine which of the two topic pages better serve the query needs and dynamically associates the most appropriate topic page for the query.

In addition to applying modifications to a topic page, the embodiments of the invention may be used to improve quality of one or more topic pages that have already been generated for a query. In one embodiment, the topic page generator together with the moderation algorithm identifies a plurality of previously generated topic pages for a query with confidence level that are below a threshold value and presents these identified topic pages at the user interface of the client 100, in response to the query. In one embodiment, the query may be initiated by a user, such as a super-user with expertise in a topic associated with the query. The previously generated topic pages may include both algorithmically generated topic pages and user generated topic pages. A topic page from the plurality of topic pages rendered at the user interface is selected and one or more modifications to the selected topic page are performed through user interaction at the user interface. The modifications to the selected topic page is to boost the confidence level of the selected topic page. The moderation algorithm receives the modifications along with one or more page parameters for the selected topic page and uses the parameters associated with the modifications to dynamically compute a new confidence level for the selected topic page. The moderation algorithm then compares the new confidence level with the existing confidence level for the topic page to determine if the modifications boosted the confidence level and, thereby, the quality of the selected topic page. If the confidence level of the modified topic page is greater than the original selected topic page, it is understood that the modifications have improved the quality of the topic page and the modifications are implemented. Otherwise, the modifications are discarded.

Figure 2:
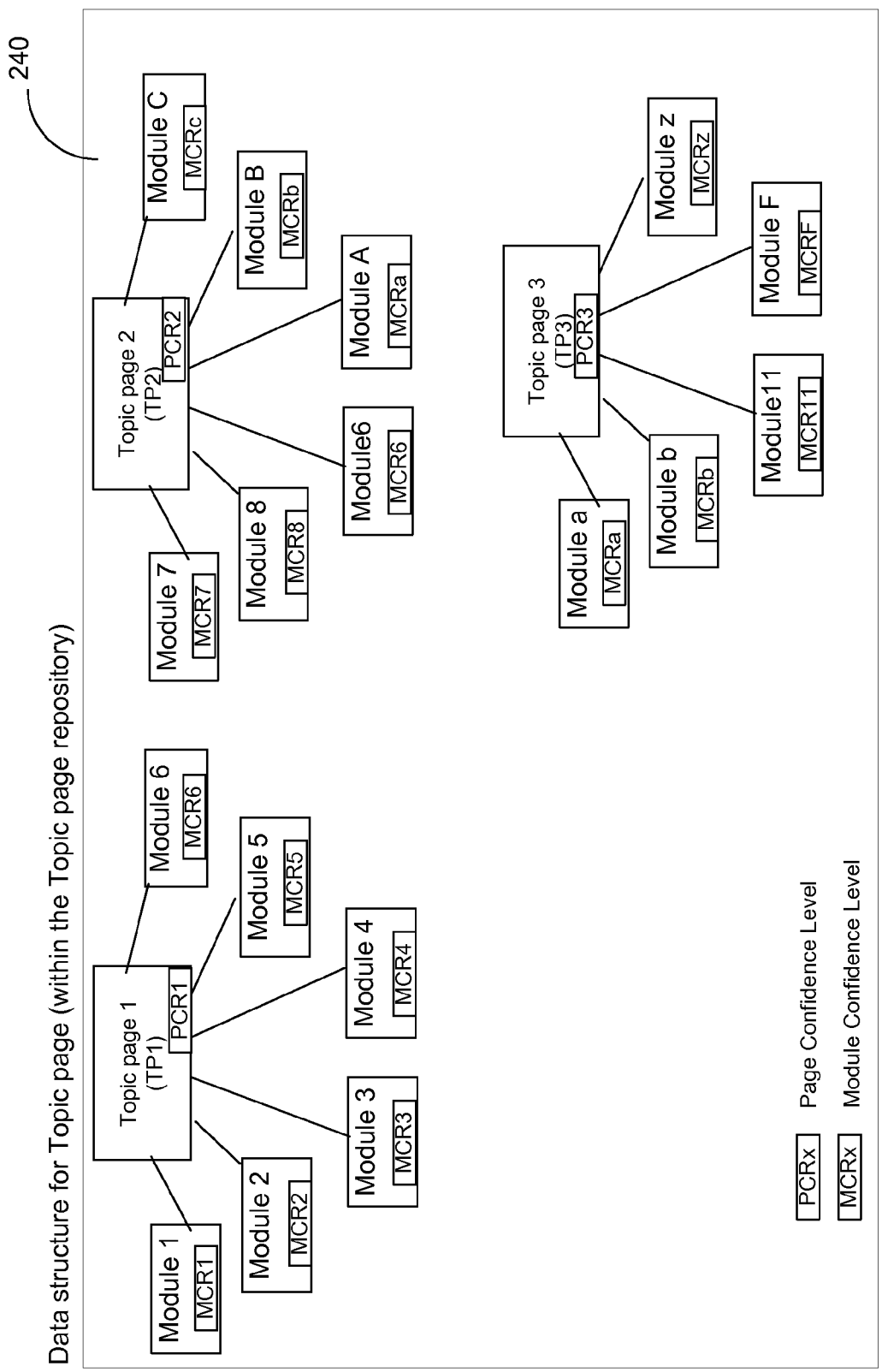
FIG. 2 illustrates a sample data structure of a topic page within a topic page repository, in one embodiment of the invention.

FIG. 2 illustrates a simplified data structure for a topic page within a topic page repository 240. The topic page repository 240 is a database that stores a plurality of topic pages, TP1, TP2, TP3, etc., for various different queries. The topic page repository 240 s a repository for both user generated topic pages and algorithmically generated topic pages. A query may be associated with one or more topic pages. Each topic page is associated with a plurality of page parameters including a page confidence level, such as PCR1, etc. Some of the page parameters associated with each page may include page ID, one or more query dimensions, such as query category, query intent, query geo location, etc., page confidence level, page content, page creation date, module ID, normalized query frequency, engagement metrics from topic page usage, etc. Each topic page includes a plurality of modules, such as Module 1, Module 2, Module 3, etc., with varied content. The modules are, in turn, associated with one or more module parameters including module confidence level, such as MCR1, MCR2, etc. Some of the module parameters associated with each module may include module ID, module name, module category, module content, module intent, module confidence level, module dimensions, module quality, etc. In addition to the topic page and corresponding module information, the topic page repository may also include a plurality of user parameters associated with a plurality of users. Some of the user parameters associated with the users may include user ID, user status (active, inactive), user level (novice, junior, senior, expert), user confidence level, user geo location, frequency of change implemented by the user, quality of user modification, user reputation, etc. The user parameters of one or more users may be associated with a topic page when the topic page was created or modified by a user. The confidence level of a topic page is computed as a function of one or more module parameters and user parameters including confidence level of the corresponding modules and users that are associated with the topic page.

Figure 3A:
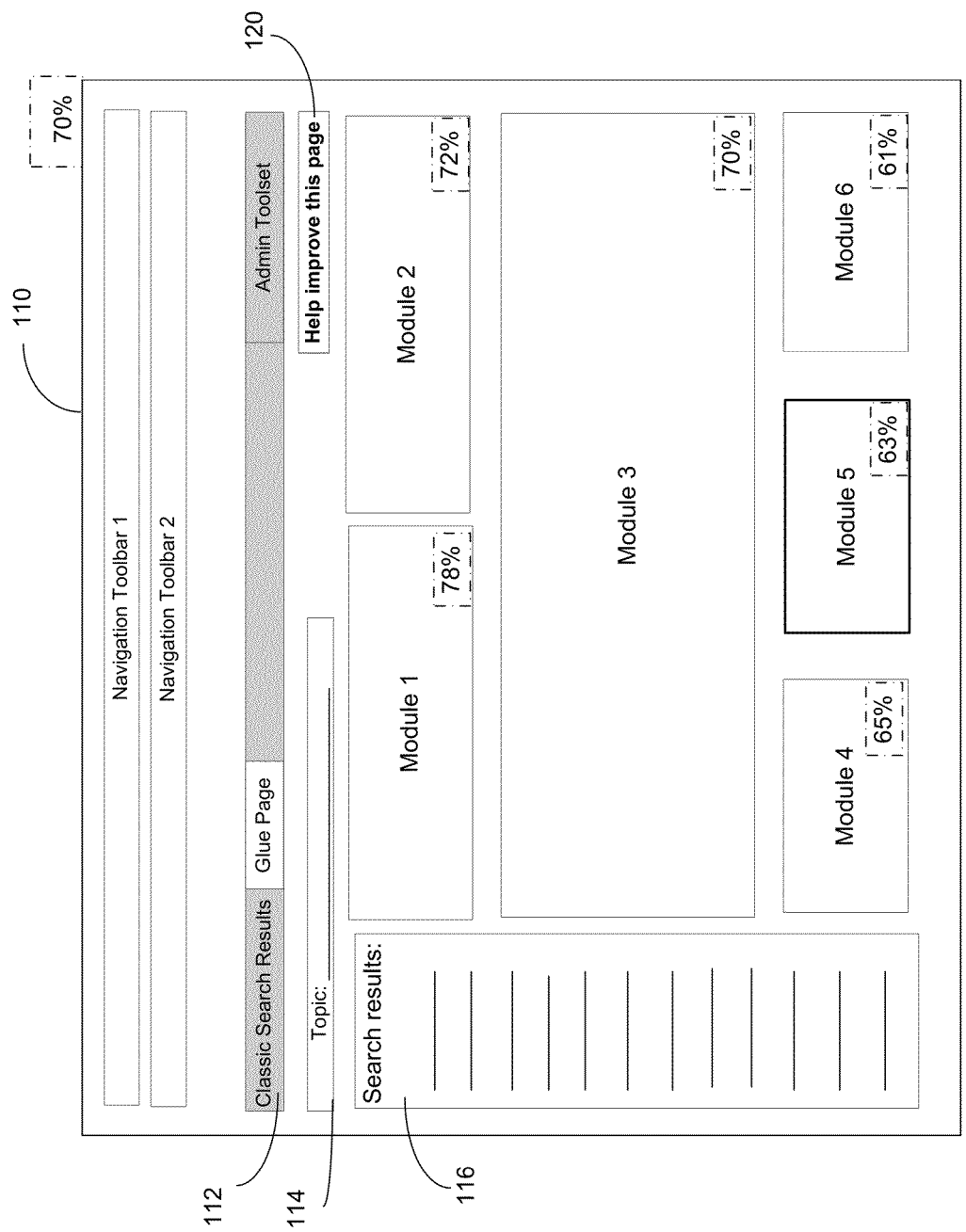

FIGS. 3A, 3B-1, 3B-2 and 3C illustrate simplified block diagrams of various topic pages rendered at a user interface. FIG. 3A illustrates a block diagram of a typical topic page 110 that is returned in response to a query. The topic page includes a plurality of navigation bars and a plurality of modules that match the query. The topic page also includes a page type 112 that reflects the type of topic page that is being rendered, such as a classic search results page or a glue page. When a query is received at a user interface, the query is analyzed to determine one or more dimensions of the query. Some of the dimensions of the query may include query topic category, query intent and query geo location. It should be noted that the query dimensions are exemplary and should not be considered exhaustive. As a result, other dimensions to the query may also be considered. The topic category associated with the query is displayed as topic 114. A plurality of modules, such as Module 1, Module 2, etc., with varied content that match the one or more dimensions of the query are included in the topic page. The topic page may also include a search results module. The search results module includes a plurality of search result links that match the one or more dimensions of the query. As mentioned earlier, each topic page is associated with a confidence level. The confidence level of the topic page, when generated by an algorithm, is influenced by the confidence level of corresponding modules that make up the topic page. Similarly, when a topic page is generated or modified by a user, the confidence level of the topic page is further influenced by the confidence level of the user contributing to the creation or modification of the topic page in addition to the confidence levels of the corresponding modules that make up the topic page.

FIG. 3A illustrates the confidence level of the topic page and each of the modules that make up the topic page, in one embodiment of the invention. In the example illustrated in FIG. 3A, the topic page has a confidence level of 70%. The confidence level of the topic page may be a function of confidence levels of the plurality of modules that make up the topic page and confidence level of one or more users that have contributed to the topic page. In one embodiment, when the topic page is algorithmically generated using a topic page generator, the confidence level of the topic page may be a function of the various modules that make up the topic page. In this embodiment, the user confidence level is not considered. In another embodiment, the topic page that is algorithmically generated may include one or more user generated modules. In this embodiment, the user confidence level and other user parameters are part of the module parameters associated with the user generated module. The confidence level of the topic page, in this embodiment, is a function of confidence level and other parameters of modules that make up the topic page and confidence level and other parameters associated with the user that contribute to the one or more modules of the topic page. In the example illustrated in FIG. 3A, the search results module is not associated with any confidence level as it is a combination of various search result links that are obtained from various sources and are not attributed to any single source or user.

Figures 1, 3B:
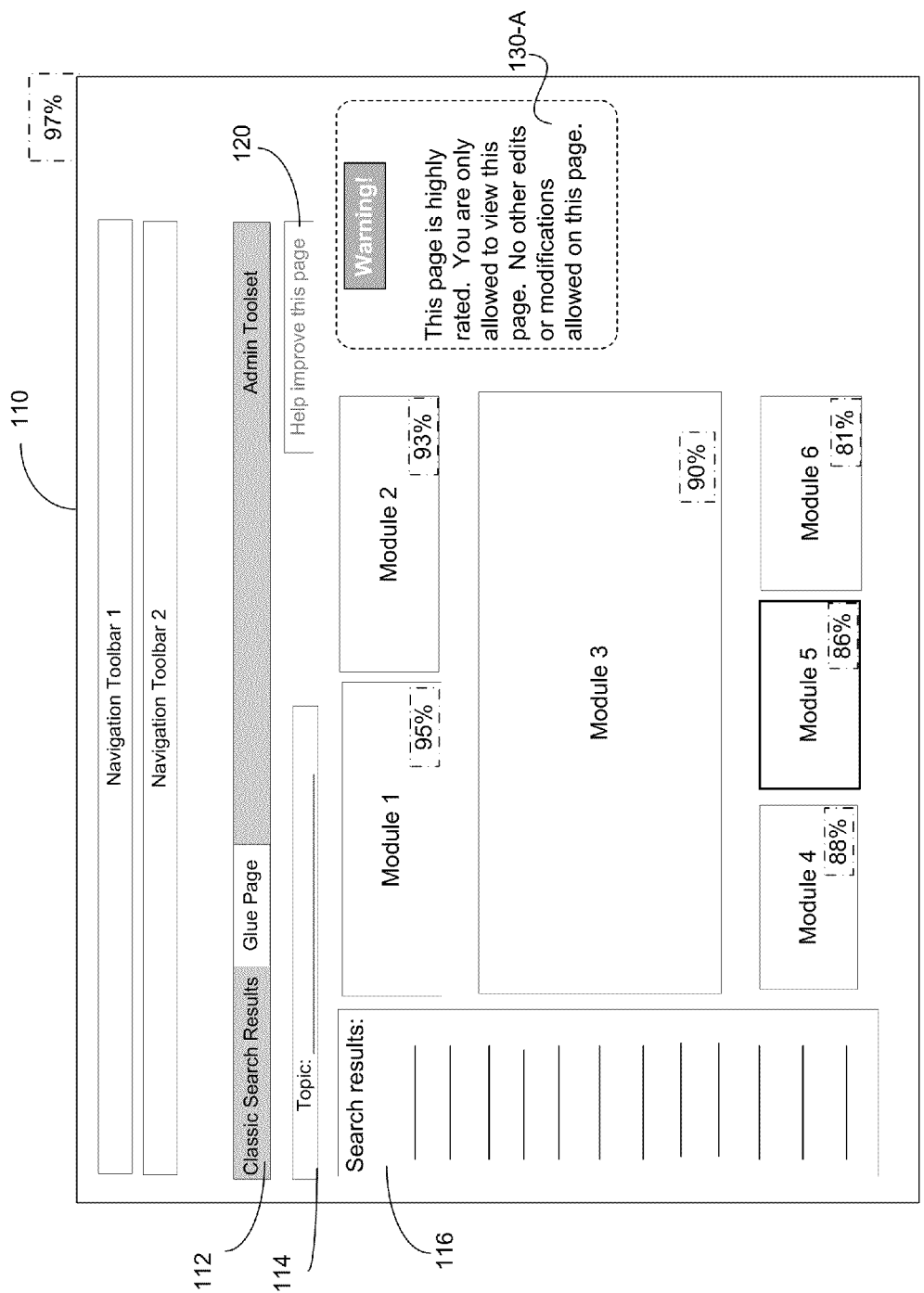
Figures 2, 3B:
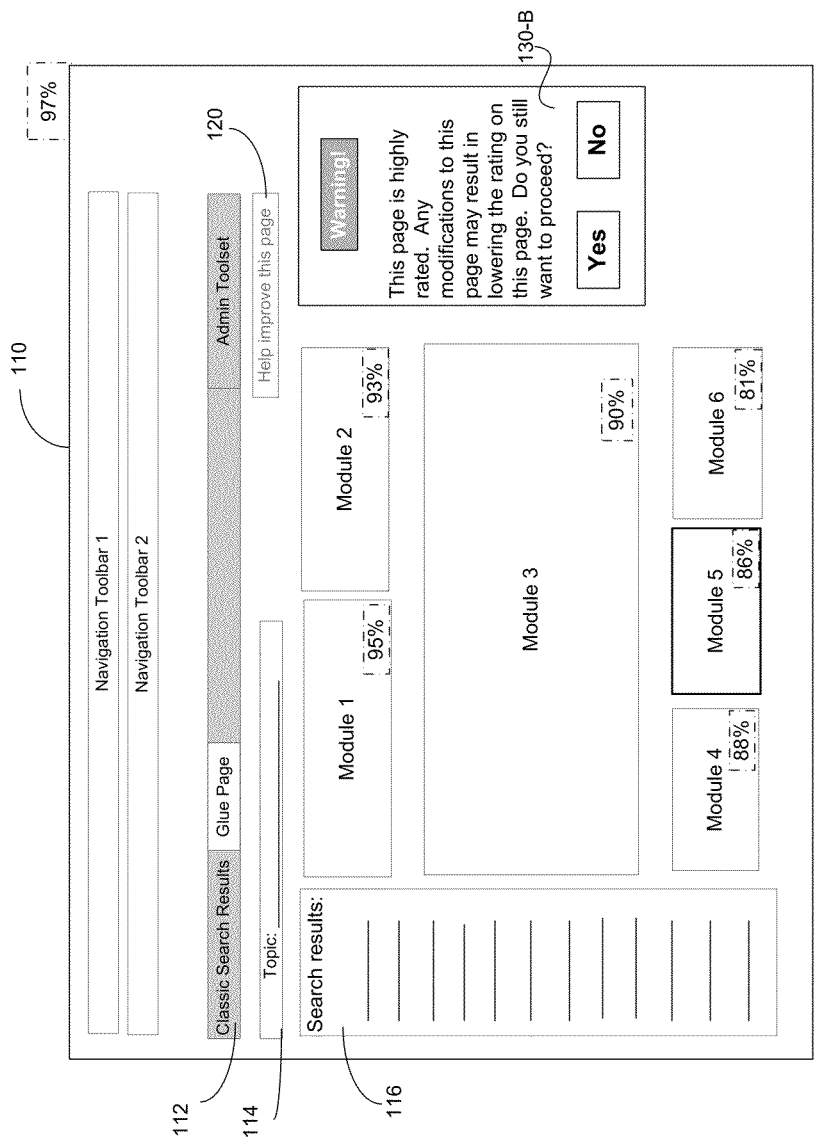

FIGS. 3B-1 and 3B-2 illustrate various user options that might be available at the topic page during modification of the topic page. When a user tries to modify a highly rated topic page 110, the moderation algorithm evaluates the confidence level of the topic page and based on the evaluation may deter the user from modifying the topic page or may allow the user to continue with the modification. In one embodiment illustrated in FIG. 3B-1, a warning message may be rendered on the topic page informing the user that the topic page may not be altered but can only be viewed. In one embodiment, the warning message is provided as a pop-up window, 130-A. It should be noted that the warning message or any form of communication may be used to deter the user from modifying a highly rated topic page. In another embodiment illustrated in FIG. 3B-2, a warning message is provided to the user indicating that the user is trying to modify a highly rated topic page and provide an option to either abandon the modification or proceed with the modification. As in FIG. 3B-1, the warning message may be provided in the form of a pop-up window 130-B, as shown in FIG. 3B-2, or could be rendered in any other form.

Figure 3C:
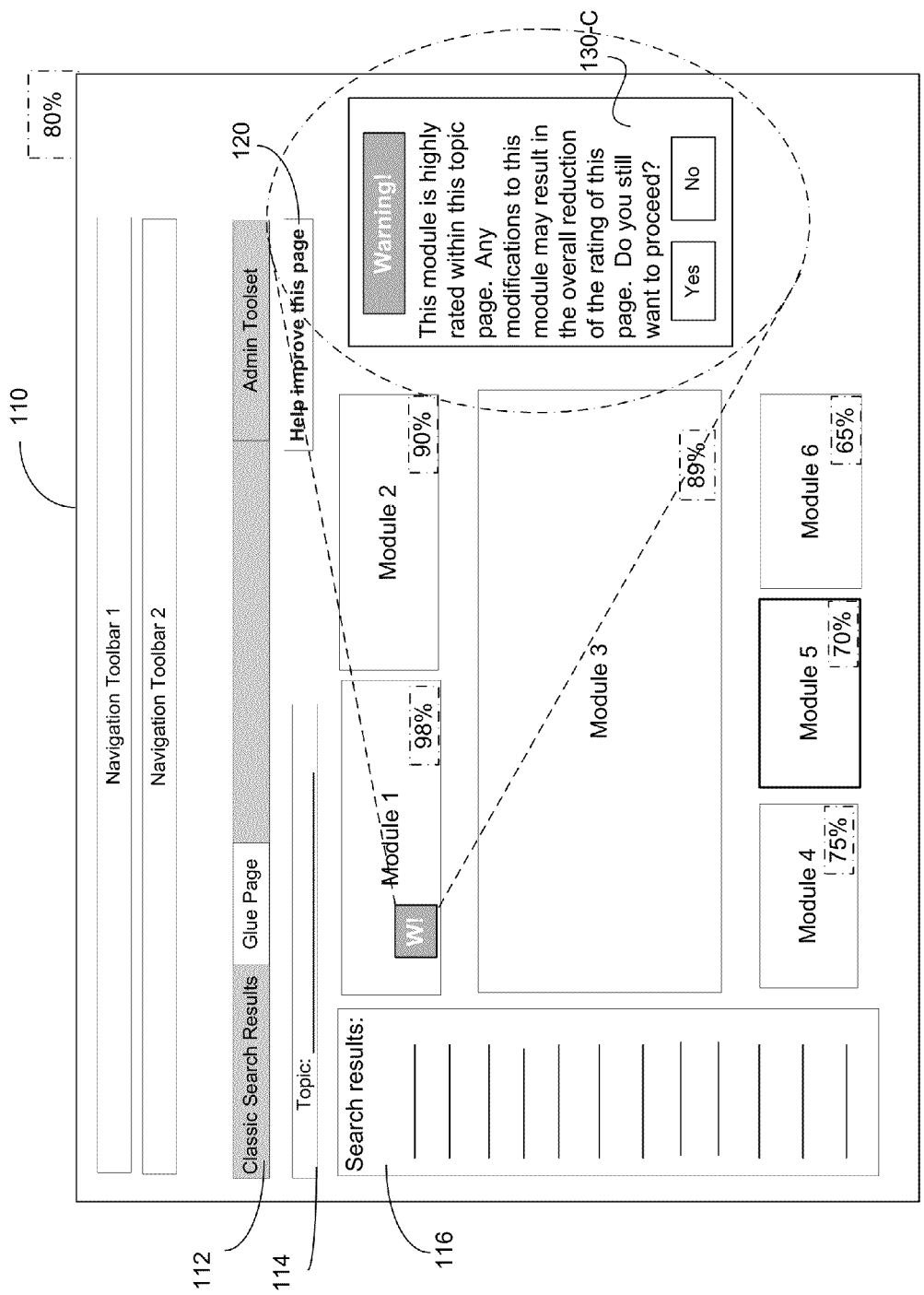

Along similar lines, when a user tries to modify a highly rated module within the topic page, the user may be provided with similar warning messages and either allowed to modify the content of the module or to abandon the modification. The moderation algorithm will first determine the confidence level of the topic page and compare it against a threshold value. If the confidence level of the topic page is above a threshold value, the moderation algorithm may check the confidence level of the module with in the topic page. It may be possible that the module, which the user is trying to modify, has a low confidence level. If the module has a low confidence level, the moderation algorithm may allow the user to modify the module in order to boost the confidence level of the module and, in the process, further boost the confidence level of the topic page. If the module has a confidence level higher than the threshold value, then a warning message, similar to the one rendered for the topic page, may be rendered for the module. For instance, the topic page may include a News module with a 95% confidence level and a video module with a 50% confidence level. If a user tries to customize this topic page and attempts to delete the News module, then a warning message indicating that the user is trying to delete a module that is highly ranked in the topic page may be rendered and the user may be prevented from modifying the topic page. FIG. 3C illustrates one such warning message in the form of a pop-up window, 130-C, that warns the user and provides an option to the user to either proceed with the modification or to abandon the modification. Any other form of warning or deterrent may be used instead of the pop-up window illustrated in FIG. 3C to deter the user from making the modifications.

Still referring to FIG. 3C, if the confidence level of the topic page is below a threshold value, an option to allow a user to improve the content and, hence, the confidence level of the topic page may be provided and activated at the topic page. In FIG. 3C, this option is shown as a push button, 120. It should be noted that this option may be provided in any form and is not restricted to a push button option as shown. Referring back to FIGS. 3A, 3B-1 and 3B-2, this option is provided at the topic page and is activated or muted based on the confidence level of the topic page.

Figure 3D:
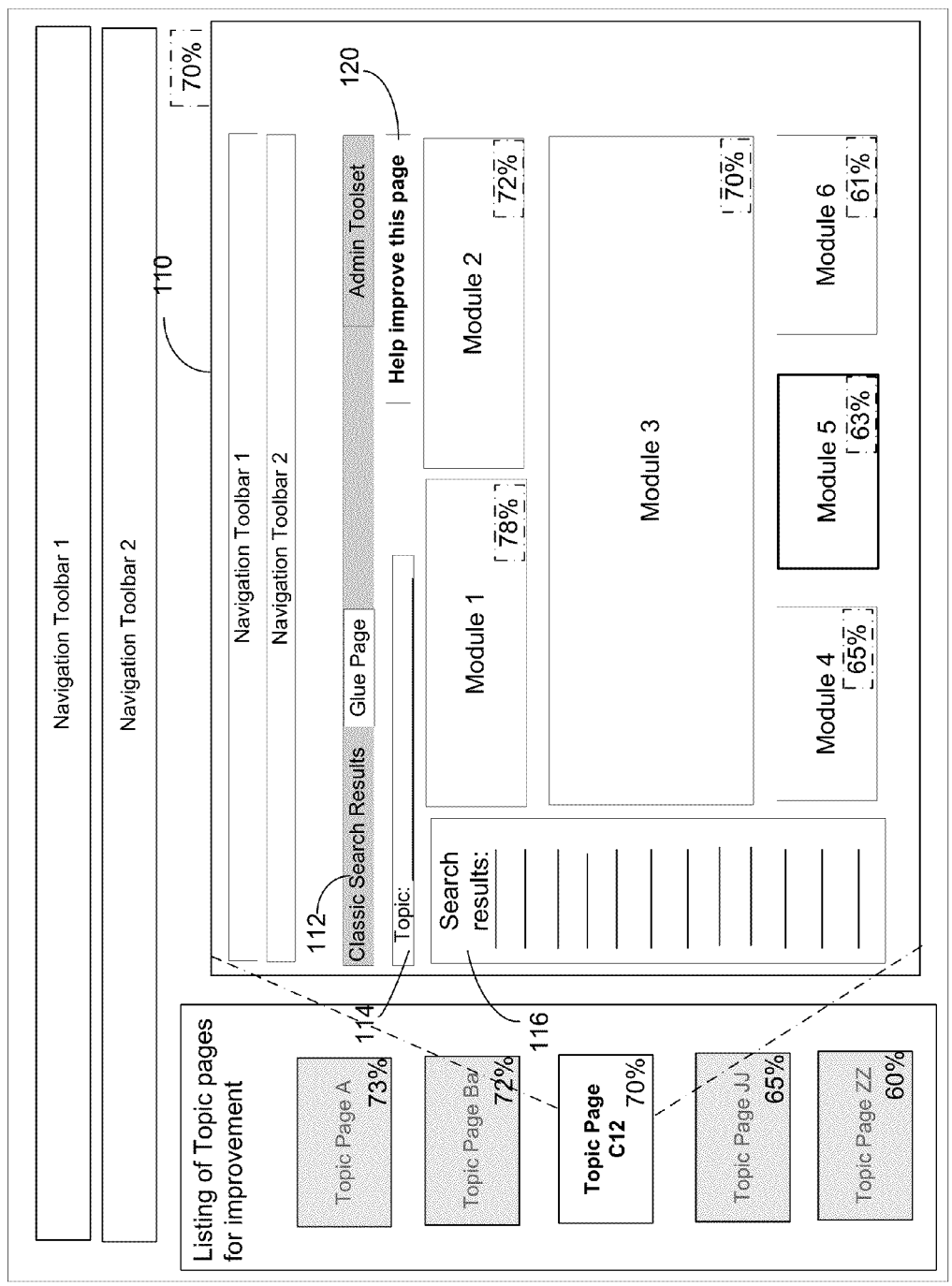

FIG. 3D illustrates another option available to a user, such as a super user, to improve the topic page, in one embodiment of the invention. In this embodiment, based on user ID, the moderation algorithm identifies a plurality of topic pages with confidence levels that are below a threshold value and presents the plurality of topic pages in response to a query. As shown in FIG. 3D, topic pages 'A', 'Ba', 'C12', 'JJ' and 'ZZ' all associated with the query and with confidence level below a threshold value are returned to a user interface on the client, in response to the query. In this instance, if the threshold value is 90%, each of the topic pages returned have a confidence level that is below the threshold value, as indicated in FIG. 3D. In one embodiment, the sequence of the topic pages presented at the user interface reflects the confidence level of the topic pages in relation to each other. For instance, Topic Page 'Ba' is presented ahead of Topic page 'JJ' as the confidence level of 'Ba' is greater than the confidence level of 'JJ'. Upon rendering of the list of topic pages that needs improvement, the user may select one of the topic pages to work on. As shown in FIG. 3D, the user has chosen topic page 'C12' to work on. At this time, the option 120 for improving the topic page is activated allowing a user to do modifications in order to improve the topic page. Upon receiving the modifications, the moderation algorithm will evaluate the modifications to determine if the modifications improve or reduce the confidence level of the topic page. Based on the evaluation, the modifications are implemented or discarded.

Figure 4:
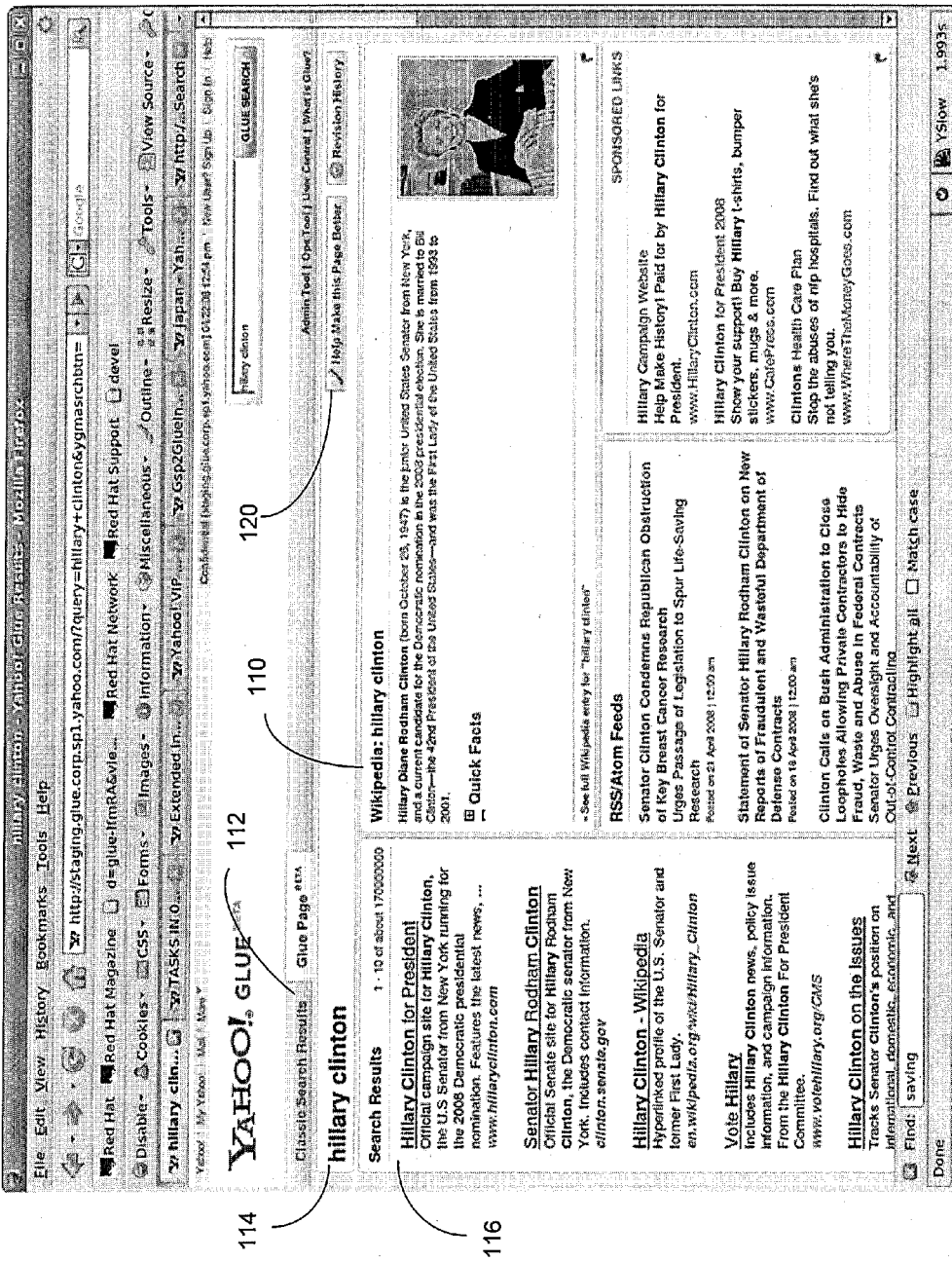
FIG. 4 illustrates a glue topic page in response to a query, in one embodiment of the invention.

FIG. 4 illustrates a snapshot of a topic page for a query, such as 'hillary clinton'. The topic page includes a plurality of navigation bars and a plurality of modules that match the query. The modules include a search results module, which includes a plurality of search result links that match the query. As mentioned earlier, based on the confidence level of the topic page, the improvement option button may be activated or muted.

FIG. 5 illustrates a tool, such as an 'Insider Tool', that is provided by the moderation algorithm to a user, such as a super user, to improve one or more topic pages for a query. As shown in FIG. 5, the Insider Tool includes a plurality of tips, tools and resource pointers to help the user in improving the topic pages. Some of the options available to the user include Video Tutorials, Discussions, FAQs (frequently asked questions) and Top Searches. FIG. 5 illustrates the result of one of the options, 'Top Searches', available to the user within the Insider Tools. The Top Searches option provides the user with a list of top popular searches for different topic categories. The user may select any topic category on the list and the user is presented with a plurality of topic pages that match the selected topic with confidence level lower than a threshold value. The user may then select a topic page from the plurality of topic pages and provide modifications so as to improve the confidence level of the selected topic page.

Figure 6:
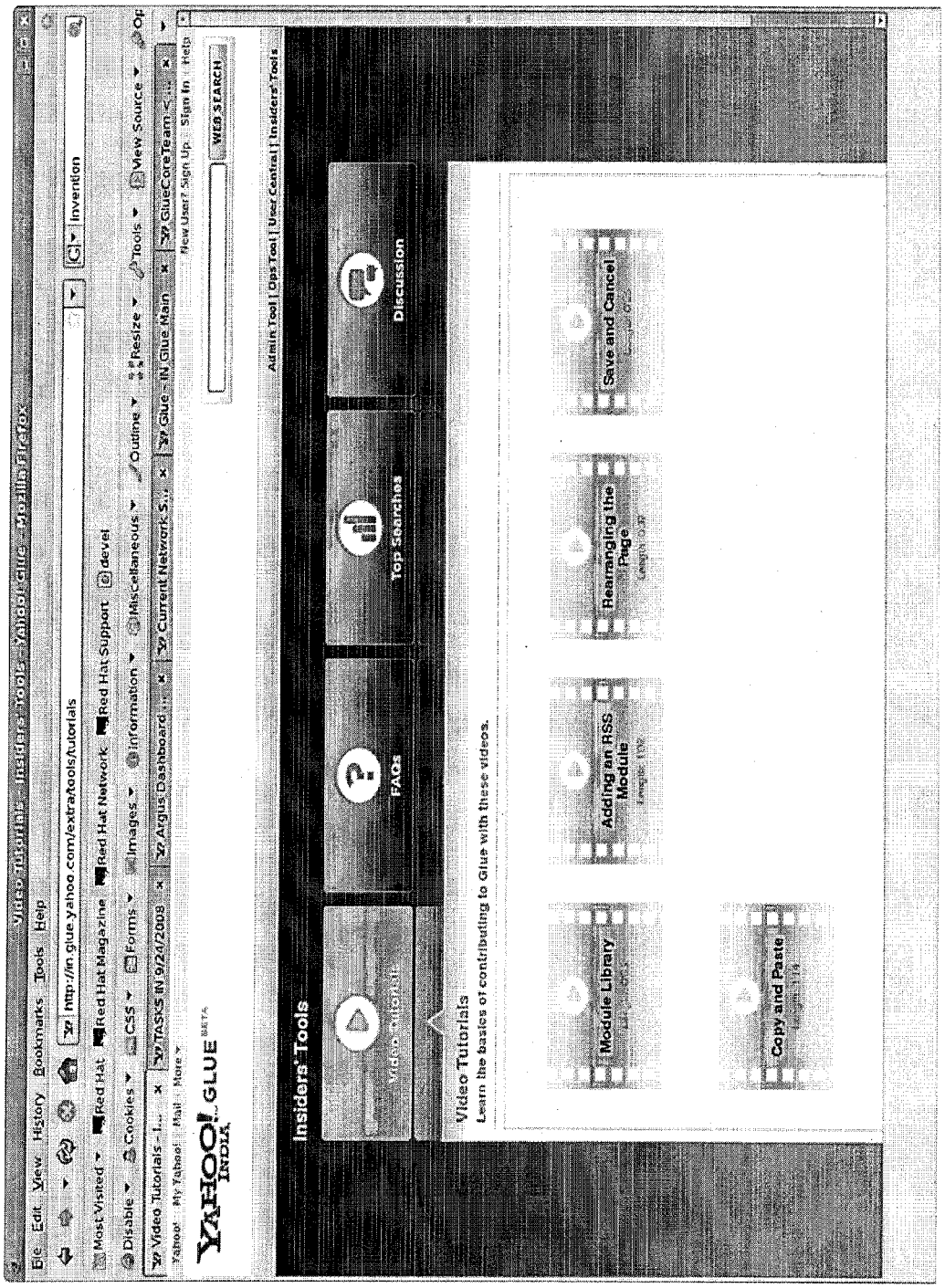
FIG. 6 illustrates a simplified block diagram of the insider tool identifying various options available to the user, in an alternate embodiment of the invention.

FIG. 6 illustrates the result of another option available to a user from within the Insider Tool. When the user selects the Video Tutorial option, a plurality of additional options are presented to the user. Each of the options provide some videos or some editorial guidelines on how to make modifications to the topic page that the user can follow when modifying any part of the topic page.

Figure 7:
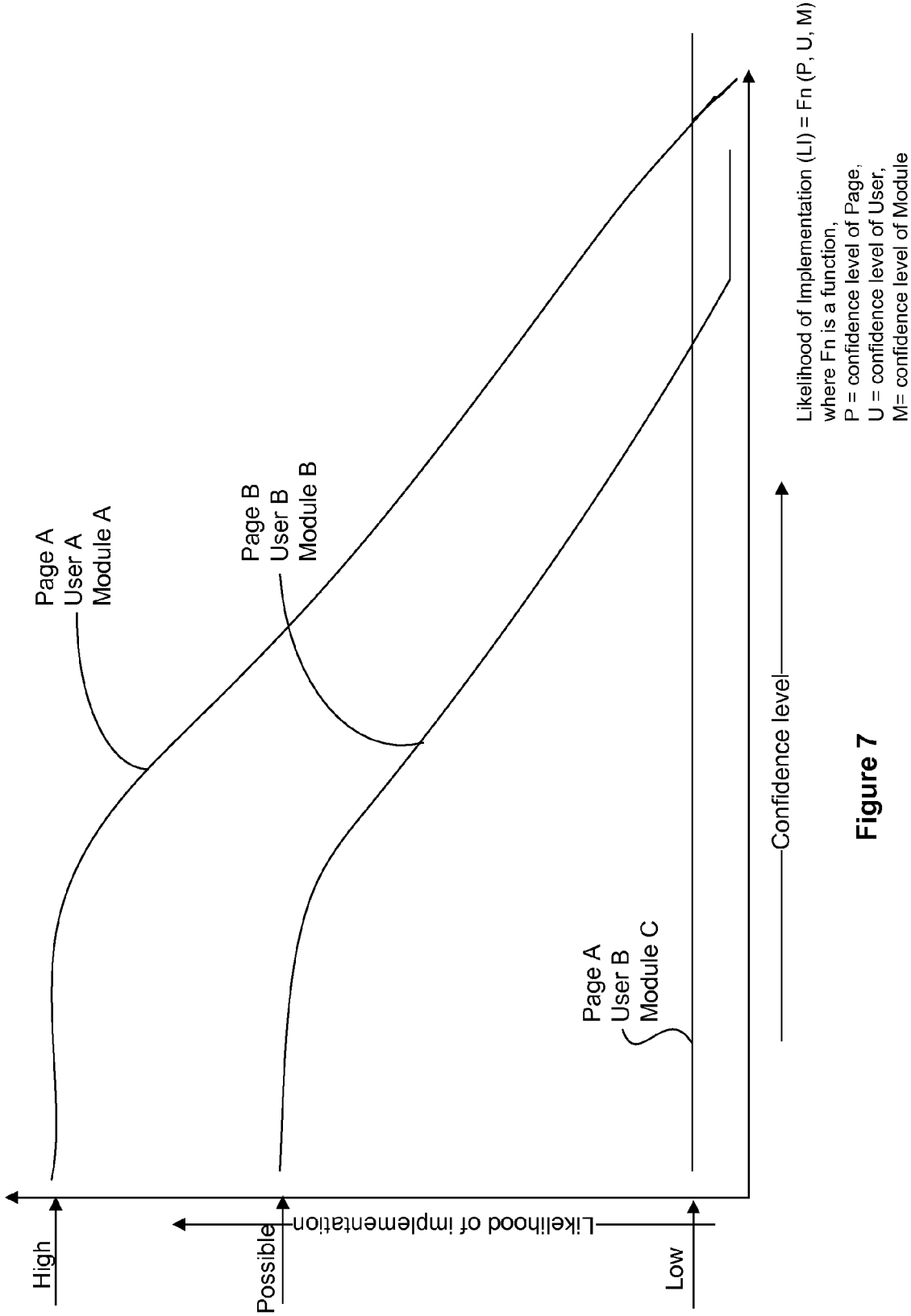
FIG. 7 illustrates a graph defining likelihood of implementation of a modification in a topic page against confidence level, in one embodiment of the invention.

FIG. 7 illustrates a graph plotting various variables against confidence level. The graph shows a two-dimensional aspect of the dependency of confidence level to the various variables, such as topic page, user and the modules within the page. The two curves that are shown in FIG. 7 identify the confidence level for two different users. The variables used in plotting the graph include topic, user and module. Each of the variables may include additional coefficients that affect the confidence level of the page. By determining the variables and the coefficients, the moderation algorithm can be fine-tuned. As can be seen from FIG. 7, there is a low likelihood of a modification being implemented when the confidence level of the topic page is high and there is a higher likelihood of the change being implemented when the confidence level of the topic page is low. Some of the variables for a page that may be considered include how frequently the topic page has been modified, how many modifications were successfully made on this page and if there are any copyright violations on the content of a module being published in the topic page. Some of the variables for a user may include has the user published before, how frequently does the user perform modifications, what is the reputation of the user making the change, what is the acceptability rate for the modifications done by the user. Based on the information about the current user's prior behavior, information about the page, information about other users on this page, a decision can be made to determine if the modifications can be allowed, if the modifications have to be validated by the user before the change can be implemented, whether the change will be viewed by the algorithm before making implementation, etc. The information is unique for each user for each topic page. It should be noted that the modifications are not recorded before implementation. Thus, other users viewing or doing modifications to the same page will not be affected by the modifications.

Figure 8:
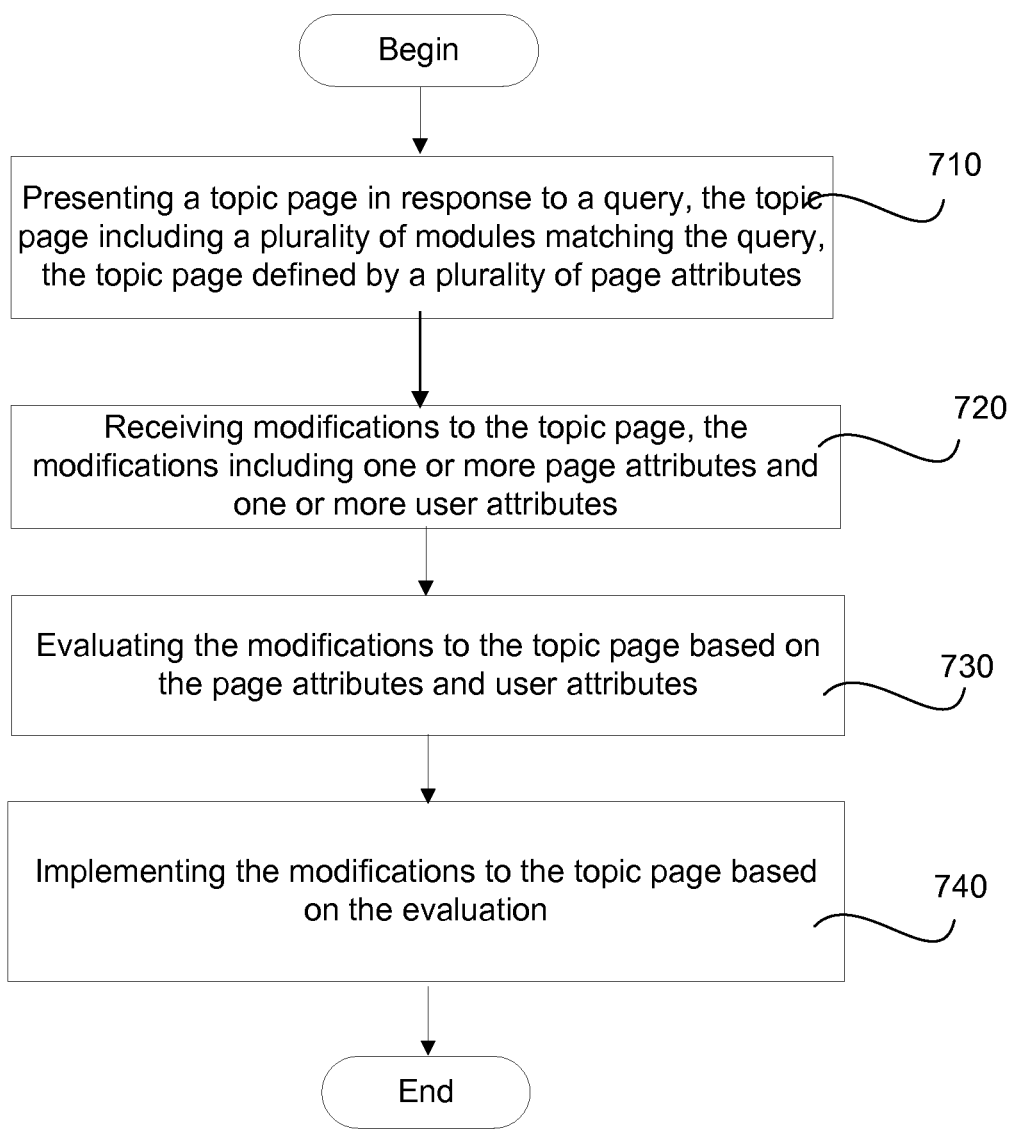
FIG. 8 illustrates a flowchart of process operations involved in guiding user moderation to enhance confidence levels of a topic page through a moderation algorithm, in one embodiment of the invention.

FIG. 8 illustrates a flowchart of various operations involved in guiding user moderation at a topic page, in one embodiment of the invention. The method begins at operation 710 where a topic page is presented in response to a query. In one embodiment, the query is received through a user interface at a client and forwarded to a search engine on the server. A moderation algorithm receives the query from the search engine, analyzes the query to determine one or more dimensions to the query and searches a plurality of sources to determine if a topic page matching the one or more dimensions is available. If a topic page is not already defined for the query, then the moderation algorithm forwards the query to a topic page generator algorithm. The topic page generator algorithm may be integrated with the moderation algorithm or may remain distinct and be available to the moderation algorithm. The topic page generator selects one or more modules that match the query, places and ranks the modules in a topic page and returns the topic page to the moderation algorithm. The placement of the modules in the topic page may determine the relative ranking of the modules. In another embodiment, the topic page is generated manually. In this embodiment, the user identifies the one or more dimensions of the query, searches a plurality of sources, identifies, places and ranks one or more modules that match the query. The manually generated topic page is forwarded to the moderation algorithm.

The moderation algorithm analyzes the various modules within the topic page and computes a page confidence level for the topic page based on module parameters associated with the modules within the topic page. The module parameters include a module confidence level for the corresponding modules. In the case of user generated topic page, the page confidence level for the topic page is also based on user parameters associated with the user that generated the topic page. The moderation algorithm associates the one or more parameters for the topic page including the computed page confidence level and forwards the topic page along with the associated parameters to a topic page repository for subsequent query. The topic page is also returned to the client for rendering, in response to the query.

Upon rendering of the topic page, a user may desire to customize the topic page. The modifications to the topic page are captured through user interactions at the topic page and transmitted to the server. The moderation algorithm on the server receives the modifications for the topic page, as illustrated in operation 720. The modifications to the topic page needs to be verified to ensure that the quality of the modules and the overall quality of the topic page is maintained. In order to ensure the quality of the topic page, the moderation algorithm first determines the confidence level of the original topic page and compares it against a threshold value. The threshold value may be a standard pre-set value or may be defined for different types of queries. In one embodiment, if the confidence level of the original topic page is greater than the threshold value, then the moderation algorithm will prevent any modifications to the topic page by blocking all modifications to the topic page. In another embodiment, when the confidence level of the original topic page is greater than the threshold value, then the modifications to the topic page are permitted so long as the modifications improve the confidence level of the topic page. In order to determine which modifications to implement, the moderation algorithm reviews and evaluates the modifications to determine if the modifications to the topic page need to be implemented or not, as illustrated in operation 730.

The moderation algorithm evaluates the modifications to the topic page by determining the confidence level of the original topic page and computing a new confidence level for the topic page based on the modifications to the topic page. Based on the evaluation, the modifications are implemented at the topic page, as illustrated in operation 740. As mentioned earlier, the modifications to the topic page may include one or more of addition of a module, deletion of a module, relocation of one or more modules, reformatting of the topic page, etc. The new confidence level for the topic page is computed using module parameters associated with the modules, page parameters associated with the topic page with and without the modifications and user parameters associated with the user making the modifications. The new confidence level for the topic page is compared against the confidence level of the original topic page. If the new confidence level is greater than the confidence level of the original topic page, the modifications are considered to improve the quality of the topic page and, hence, the modifications are implemented. If the new confidence level is less than or equal to the confidence level of the original topic page, then the modifications do not appear to improve the quality of the topic page in which case the modifications are discarded or ignored. In another embodiment, when the new confidence level is less than the confidence level of the original topic page, the modifications may still be implemented for a short period of time and discarded or maintained for the user and rendered only for the user during subsequent queries. The method concludes with the modifications either being implemented or discarded.

Figure 9:
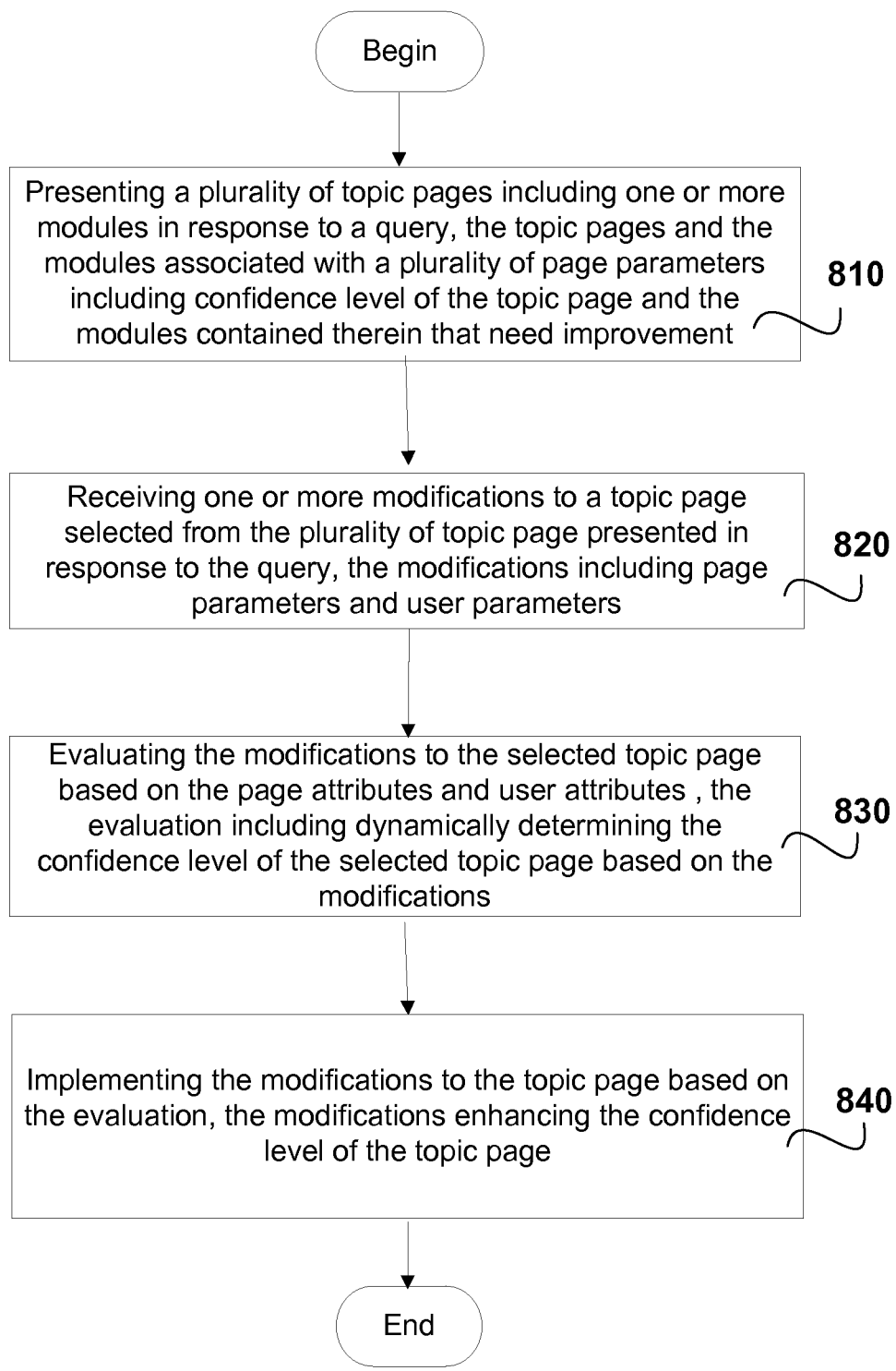
FIG. 9 illustrates a flowchart of process operations involved in enhancing confidence levels of a topic page through a moderation algorithm, in an alternate embodiment of the invention.

FIG. 9 illustrates a flowchart of various operations involved in guiding user moderation at a topic page, in one embodiment of the invention. The method begins at operation 810 wherein a plurality of topic pages matching the query are selected and presented at a user interface in response to the query. A query is received through a user interface and forwarded to the server. The user may be a super user or any user who is interested in improving the quality of one or more topic pages for the query. The query is analyzed at the server using a moderation algorithm to determine one or more dimensions for the query. Based on the analysis, one or more topic pages with confidence levels that are below a threshold value matching the query are identified and presented in response to the query.

In another embodiment, as soon as a user logs into a system equipped with the moderation algorithm, a plurality of top searches, such as the one described with reference to FIG. 5, is presented to the user. The user then selects a topic category. The moderation algorithm searches a repository of information to identify one or more topic pages matching the selected topic category and presents the selected plurality of topic pages to the user in response to the selection of the topic category by the user.

The user may select any one of the plurality of topic pages to improve the quality and the confidence level. One or more modifications to the topic page are captured in the form of user interactions at the selected topic page and forwarded to the moderation algorithm on the server. The moderation algorithm receives the modifications to the topic page including a plurality of page parameters, as illustrated in operation 820. The page parameters include a plurality of module parameters associated with the plurality of modules in the topic page and a plurality of user parameters corresponding to the user performing the modifications at the topic page.

The modifications to the selected topic page are evaluated by the moderation algorithm using the page parameters associated with the modifications, as illustrated in operation 830. Upon evaluation of the various parameters associated with the modifications and the original topic page including confidence level, the moderation algorithm determines implementing the modifications to the topic page, as illustrated in operation 840. To assist the user in improving the quality of the topic page, a tool, such as an Insider Tool, may be provided by the moderation algorithm. The tool enables the user, such as a novice user, to make the modifications by providing tools, tips and pointers to various resources. The process concludes with the implementation of the modifications at the topic page.

Thus, the various embodiments of the invention provide an alternate tool to determine an optimal topic page for the query that is different from a bucket testing mechanism. Bucket testing mechanism provides one aspect of determining which topic pages and modifications are effective for a query and uses a large sample of user-interaction data to provide an accurate prediction of which topic pages are optimal for a query and which modifications are relevant for the query and should be implemented. The current embodiments provide an alternate tool that describes another aspect for determining which topic page and which modifications are relevant to the query without relying on a large sample of user-interaction data. The resulting topic page is rich in content and quality and most relevant to the query. The tool allows individual user customizations, thereby engaging the users and boosting the popularity of the webpage while enhancing user experience. The changes requested by users during customization are reviewed to ensure that the high quality of the webpage is maintained without having to resort to large data sample. The customized webpage may be used as a good marketing and monetizing tool due to the enhanced user engagement.

It will be obvious, however, to one skilled in the art, that the present invention may be practiced without some or all of these specific details. In other instances, well known process operations have not been described in detail in order not to unnecessarily obscure the present invention.

Embodiments of the present invention may be practiced with various computer system configurations including handheld devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the invention could employ various computer-implemented operations involving data stored in computer systems. These operations are those requiring physical manipulation of physical quantities. Usually, though not necessarily, these quantities take the form of electrical or magnetic signals capable of being stored, transferred, combined, compared and otherwise manipulated.

Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can thereafter be read by a computer system. The computer readable medium can also be distributed over a network-coupled computer system so that the computer readable code is stored and executed in a distributed fashion.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for guiding user moderation at a topic page by confidence levels, comprising:

presenting a topic page in response to a query, the topic page including a plurality of modules with content that match the query, the topic page associated with a confidence level and one or more page attributes that define characteristics of the topic page and the plurality of modules contained therein;

receiving modifications to the topic page, wherein the modifications include one or more page attributes associated with the modifications and one or more user attributes, the user attributes used to derive a confidence level of a user making the modifications, wherein the confidence level of the user defines an engagement metric that measures topic page usage;

evaluating the modifications to the topic page based on the confidence levels associated with the topic page and the user, one or more page attributes and user attributes, the evaluation includes, obtaining the confidence level of the topic page before the modifications;

computing a new confidence level for the topic page based on the modifications using page attributes associated with the topic page having the modifications and the user attributes of the user making the modifications;

comparing the confidence level of the topic page without the modifications against a threshold value and against the new confidence level of the topic page with the modifications; and implementing the modifications to the topic page when the confidence level of the topic page with modifications exceeds the confidence level of the topic page without the modifications.

2. The method of claim 1, wherein presenting a topic page further includes, identifying the plurality of modules with content that match one or more dimensions of the query, the dimensions of the query defining one or more categories including a purpose for the query;

generating a topic page with the identified modules;

computing a confidence level based on the plurality of modules that make up the topic page; and associating the confidence level and one or more page attributes to the topic page.

3. The method of claim 2, further includes generating the topic page automatically through an algorithm or manually by the user, wherein the plurality of modules include one or more user defined modules.

4. The method of claim 1, wherein implementing the modifications further includes, automatically rejecting any modifications to the topic page when the confidence level of the topic page before the modifications is above a threshold value.

5. The method of claim 1, wherein implementing the modifications further includes, when the confidence level of the topic page is below the threshold value, accepting the modifications to the topic page when the new confidence level of the topic page with the modifications is greater than the confidence level of the topic page without the modifications; and rejecting the modifications to the topic page when the new confidence level of the topic page with modifications is lesser than or equal to the confidence level of the topic page without the modifications.

6. The method of claim 1, wherein implementing the modifications further includes, identifying the confidence level of the user making the modifications to the topic page;

comparing the confidence level of the user against the threshold value;

automatically accepting the modifications to the topic page when the confidence level of the user is greater than the threshold value; and rejecting the modifications to the topic page when the confidence level of the user is less than or equal to the threshold value.

7. The method of claim 1, wherein implementing the modifications further includes, automatically accepting the modifications to the topic page when the confidence level of the topic page without modifications is below a threshold value.

8. The method of claim 1, wherein evaluating the modifications further includes, identifying a user generated topic page for the query;

receiving an algorithmically generated topic page for the query; and examining content and confidence level of the user generated topic page against the algorithmically generated topic page.

9. The method of claim 8, wherein implementing of the modifications further includes, replacing the user generated topic page with the algorithmically generated topic page when the content of the user generated topic page is older than the algorithmically generated topic page and the confidence level of the user generated topic page is lower than the confidence level of the algorithmically generated topic page.

10. The method of claim 2, wherein one or more dimensions include one or more of topic category, one or more intents and geo-location, wherein the page attributes include one or more of page ID, topic category, one or more intents, geo-location, page confidence level, list of modules, an intent for each module, confidence level of each module; normalized query frequency, number and quality of the modules, engagement metrics from topic page usage; and wherein user attributes include user ID, confidence level of the user, user status, user level, user geo location, frequency of change implemented by the user and user reputation.

11. A method for guiding user moderation at a topic page by confidence levels, comprising:

presenting a plurality of topic pages, each of the plurality of topic pages containing a plurality of modules that match the query, each of the plurality of topic pages associated with a confidence level and one or more page attributes that define characteristics of the corresponding topic page and the modules contained therein;

receiving modifications to a topic page selected from the presented plurality of topic pages, wherein the modifications include one or more user attributes of a user making the modifications and one or more page attributes, the user attributes used to derive confidence level of the user, wherein the confidence level of the user defines an engagement metric that measures topic page usage;

evaluating the modifications to the topic page based on the confidence levels associated with the topic page and the user using the respective page attributes and user attributes, the evaluation includes, obtaining the confidence level of the topic page before the modifications;

computing a new confidence level for the topic page based on the modifications using attributes associated with the topic page having the modifications and the user attributes of the user making the modifications;

comparing the confidence level of the topic page without the modifications against a threshold value and against the new confidence level of the topic page with the modifications; and implementing the modifications to the topic page when the confidence level of the topic page with the modifications exceeds the confidence level of the topic page without the modifications, wherein the confidence level of each of the topic pages without the modifications presented in response to the query is below a threshold value.

12. The method of claim 11, further includes generating the topic pages automatically through an algorithm or manually, wherein the plurality of modules includes one or more user generated modules.

13. The method of claim 11, wherein implementing the modifications further includes, rejecting the modifications to the topic page when the new confidence level of the topic page with modifications is lesser than or equal to the confidence level of the corresponding topic page without the modifications.

14. The method of claim 11, wherein implementing the modifications further includes, identifying the confidence level of the user making the modifications to the topic page;

comparing the confidence level of the user against the threshold value;

accepting the modifications to the topic page when the confidence level of the user is greater than the threshold value; and rejecting the modifications to the topic page when the confidence level of the user is less than or equal to the threshold value.

15. An algorithm embedded in a server of a computing system which when executed by a processor of the computing system enables guiding user moderation at a topic page by confidence levels, comprising:

a topic page generator algorithm configured to receive a query, analyze and categorize the query, select a plurality of modules that match the query, place and rank the plurality of modules in the topic page, the topic page generator algorithm associating a confidence level and one or more page parameters that define characteristics of the topic page; and a moderation algorithm configured to receive modifications to the topic page, evaluate and implement the modifications based on one or more attributes associated with the modifications, the attributes associated with the modifications include one or more page attributes and one or more user attributes, wherein the user attributes are associated with a user making the modifications, wherein the evaluate includes, obtaining the confidence level of the topic page before the modifications;

computing a new confidence level for the topic page based on the modifications using attributes associated with the topic page and the user attributes of the user making the modifications comparing the confidence level of the topic page without the modifications against a threshold value and against the new confidence level of the topic page with the modifications and implementing the modifications when the confidence level of the topic page with the modifications exceeds the confidence level of the topic page without the modifications, the user attributes used to derive a confidence level of the user, wherein the confidence level of the user defines an engagement metric that measures the topic page usage.

16. The algorithm of claim 15, wherein the algorithm includes logic to interact with a plurality of sources to obtain one or more modules that match the query.

17. The algorithm of claim 15, wherein the algorithm includes logic to interact with a topic page repository to obtain one or more topic pages for the query and to store one or more topic pages for the query.

18. The algorithm of claim 15, further includes an insider guidance tool to provide guidance and resources for providing modifications to the topic page, the modifications used to improve a confidence level of the topic page.

* * * * *